(12) United States Patent
Souliac et al.

(10) Patent No.: US 6,399,237 B1
(45) Date of Patent: Jun. 4, 2002

(54) SEALED STORAGE CELL WITH AN ALUMINUM TERMINAL

(75) Inventors: Laurent Souliac, Le Bouscat; Jean Fradin, Fontaine le Comte; Gérard Rigobert, Fargues St Hilaire, all of (FR)

(73) Assignee: Alcatel, Paris (FR)

( * ) Notice: Subject to any disclaimer, the term of this patent is extended or adjusted under 35 U.S.C. 154(b) by 61 days.

(21) Appl. No.: 09/612,362

(22) Filed: Jul. 7, 2000

(30) Foreign Application Priority Data

Jul. 8, 1999 (FR) ............................. 99 08847

(51) Int. Cl.[7] ............................. H01M 2/12; H01M 2/06
(52) U.S. Cl. ............................. 429/56; 429/61; 429/170; 429/182; 429/183
(58) Field of Search ............................. 429/163–185, 429/56, 58, 61

(56) References Cited

U.S. PATENT DOCUMENTS 5,834,133 A  * 11/1998  Narukawa et al.
6,146,785 A  * 11/2000  Rigobert et al.

FOREIGN PATENT DOCUMENTS

| EP | 0 620 610 A1 | 10/1994 |
| EP | 0 771 040 A2 | 5/1997 |
| EP | 0 822 605 A2 | 2/1998 |
| EP | 0 887 876 A1 | 12/1998 |
| FR | 2 752 092 A1 | 2/1998 |
| FR | 2 756 421 A1 | 5/1998 |
| FR | 2 770 031 A1 | 4/1999 |

* cited by examiner

*Primary Examiner*—Gabrielle Brouillette
*Assistant Examiner*—Susy Tsang-Foster
(74) *Attorney, Agent, or Firm*—Sughrue Mion, PLLC

(57) ABSTRACT

A cylindrical high-capacity sealed storage cell having a terminal at one end which is made of aluminum, wherein: the one end includes an aluminum cover adapted to be brought into contact with an external electrical connecting part by a clamping structure which is at least in part under the cover and co-operates with an external assembly mechanism, the clamping structure being made from a material selected from the group consisting of stainless steel, nickel-plated steel, copper, and brass; and the cover of the cell is sealed by a metal sealing cap under the cover.

14 Claims, 6 Drawing Sheets

SEALED STORAGE CELL WITH AN ALUMINUM TERMINAL

The present invention relates to a sealed storage cell having a capacity greater than 10 Ah and comprising a practically cylindrical container, an electrochemical stack, and two opposite ends with terminals of opposite polarity, at least one end containing aluminum. The storage cell is used in particular to power electrical or hybrid vehicles, typically having a capacity of 30 Ah to 50 Ah. The invention relates more particularly to sealed storage cells in which the electrochemical couple is one that operates in the presence of a non-aqueous electrolyte such as the lithium-ion couple.

BACKGROUND OF THE INVENTION

High-capacity sealed lithium-ion storage cells used in the automobile industry for the main or back-up propulsion of electric vehicles usually have a stainless steel or nickel-plated steel container and a pure aluminum positive terminal.

One advantage of using aluminum is its low density, which increases the capacity per unit mass of a cell in which it is used for the cover and/or the container. On the other hand, pure aluminum is mechanically weaker than nickel-plated steel or stainless steel. This is why, if the cover at the positive end of a cell is made of aluminum, it is difficult to design a system for connecting an external connection bar to the cell which is compact, reliable and stable in time and which does not generate too high an electrical resistance as it ages, especially if the cell has high capacity and the connections must be thick in order to carry high currents. To be effective and stable in time, aluminum screw fasteners necessitate the use of a screwthread occupying a relatively large volume, to achieve a good grip in the material. However, the benefit of using aluminum, in terms of capacity per unit volume, is then lost because of the volume occupied by the connections. As a result of this the improvement in terms of capacity per unit volume is minor, despite the increase in capacity per unit mass.

European Patent Application EP-A2-0 771 040 describes a sealed cylindrical storage cell comprising an electrochemical stack inside a stainless steel container. It can be used to power electric vehicles. The steel cover incorporates an aluminum terminal and can include a system for evacuating gas from inside the cell in the event of a malfunction. This system takes the form of a relief valve at an off-center position on the cover. The cover also includes an electrolyte filler orifice at an off-center position symmetrical to that of the valve. A cell of this kind has drawbacks. For one thing, the position of the relief valve means that when a connecting bar is fitted, for example when the cell is used to power a hybrid electric vehicle, the bar must be positioned so that it does not impede the operation of the valve. Also, the volume of the positive end or terminal is very large, because ultra-pure aluminum is a particularly soft material, and this represents an unacceptable loss in terms of the capacity per unit mass and the capacity per unit volume of the cell. Finally, the fact that the container is made of steel and the positive terminal is made of aluminum makes it essential to isolate these two components electrolytically, by means of a gasket, which increases costs and introduces the risk of leaks. There is already a risk of leaks at the negative terminal, which is made of copper. It is therefore difficult to accept doubling the risk of leaks from the cell by using gaskets at both ends.

OBJECTS AND SUMMARY OF THE INVENTION

Accordingly, one object of the invention is to provide a sealed high-capacity storage cell whose container is practically cylindrical, which has two terminals at the two ends of the practically cylindrical container, and in which one of the two terminals includes a current collection arrangement made of aluminum that is compact, reliable, and efficient throughout the service life of the cell.

The present invention provides a sealed storage cell, of capacity greater than 10 Ah, including a practically cylindrical container, an electrochemical stack, and two opposite ends providing terminals of opposite polarities, one of the ends comprising aluminum, wherein:

said one end comprises an aluminum cover, said aluminum cover is adapted to be brought into electrical contact with an electrical connecting part external to the cell by clamping means which are at least in part on the side of said cover inside the cell and which cooperate with assembly means external to the cell, and said clamping means are made from a material selected from the group comprising stainless steel, nickel-plated steel, copper, and brass; and said cover of said cell is sealed by a metal sealing cap on the side of the cover inside the cell.

The use of the material chosen for the clamping means has the advantage that a high clamping torque can be used for mounting the end of the cell and for making a connection to an external electrical connecting part.

In one embodiment, the container of the cell is made of aluminum. The advantage of aluminum over the stainless steel used in the prior art is improved capacity per unit mass. Another advantage compared to the prior art is an improved seal, as there is no need for a gasket at the end of the cell having the aluminum cover to prevent problems caused by electrolytic corrosion.

In one embodiment of the cell of the invention, the clamping means comprise a screwthread. This advantageously provides a screwed connection to an external connecting part that is highly reliable and highly stable, particularly in the case of a high-capacity cell. In a first variant, the clamping means comprise a part bearing on the face of the cover inside the cell and having a screwthread. For example, the clamping means comprise a nut or a pin. In a second variant, the clamping means comprise a bush.

The clamping means are preferably associated with a rotation-preventing system. This facilitates assembling the cell.

In one embodiment the cover includes openings enabling gas to escape from the cell.

In a different embodiment the metal sealing cap includes at least one weakened area adapted to rupture if the pressure inside the cell increases to an internal pressure value greater than or equal to a pressure P1.

In a preferred embodiment the metal sealing cap is pressed against said clamping means which can then be adapted to prevent deformation of a part of said metal sealing cap, preferably a central part thereof, in the event of a pressure rise inside the cell up to a value of the internal pressure greater than or equal to the pressure P1. This embodiment has the advantage of contributing to ensuring that tearing of the weakened areas of said cap occurs cleanly at the required value, reducing the margin for error.

In a different embodiment the cell of the invention includes a switch having a sensor installed in a housing via an opening in the cover so that the sensor faces the metal sealing cap, the switch further having two terminals for making an electrical connection to an electronic disconnector device adapted to interrupt the flow of current in the cell in the event of deformation of said metal sealing cap due to the pressure inside the cell rising to a value greater than or equal to a pressure P2, the pressure P2 being less than or equal to the pressure P1. This has an advantage in terms of safety, by enabling the source of the malfunction to be cut off as soon as possible before the safety device comprising the weakened areas of the metal sealing cap is tripped. A portion of said metal sealing cap is preferably adapted to be turned inside out by the pressure inside the cell rising to a value greater than or equal to the pressure P2, so as to be in electrical contact with the switch. The contact is then a clean contact.

The invention relates more particularly to sealed storage cells in which the electrochemical couple is one that operates in the presence of a non-aqueous electrolyte such as the lithium-ion couple. Such cells are generally used to power electric and hybrid vehicles.

BRIEF DESCRIPTION OF THE DRAWINGS

The invention will be better understood and other features and advantages will become apparent on reading the following description, which is given by way of non-limiting example and with reference to FIGS. 1 to 8. The same reference numerals apply to components or portions of components which are identical in all the figures.

MORE DETAILED DESCRIPTION

Figure 1:
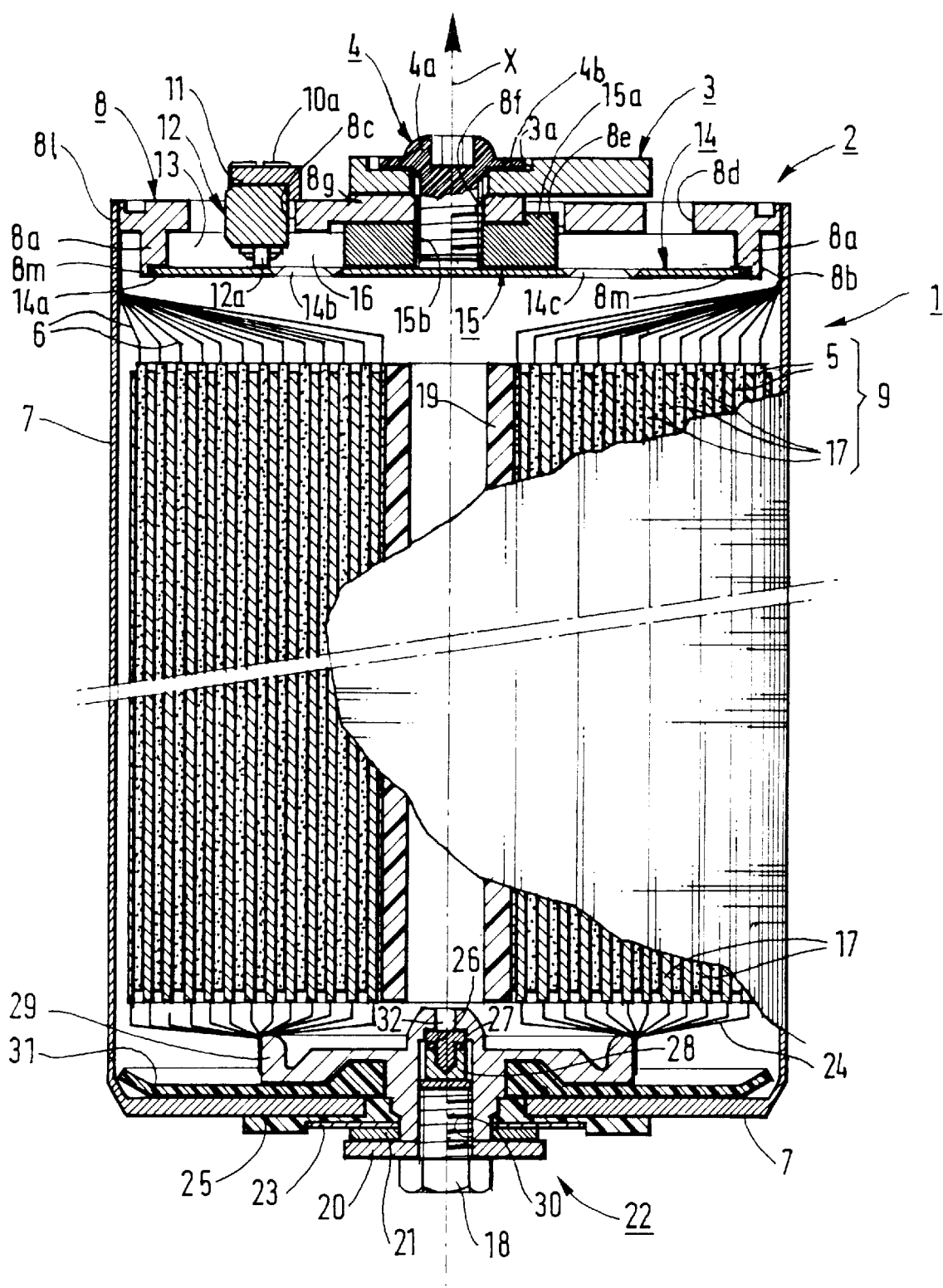
FIG. 1 is a diagrammatic view in longitudinal A SEALED STORAGE CELL WITH AN ALUMINUM TERMINAL section taken along the line I—I in FIG. 2 of one embodiment of a cell of the invention, in which the clamping means comprise a nut.
Figure 2:
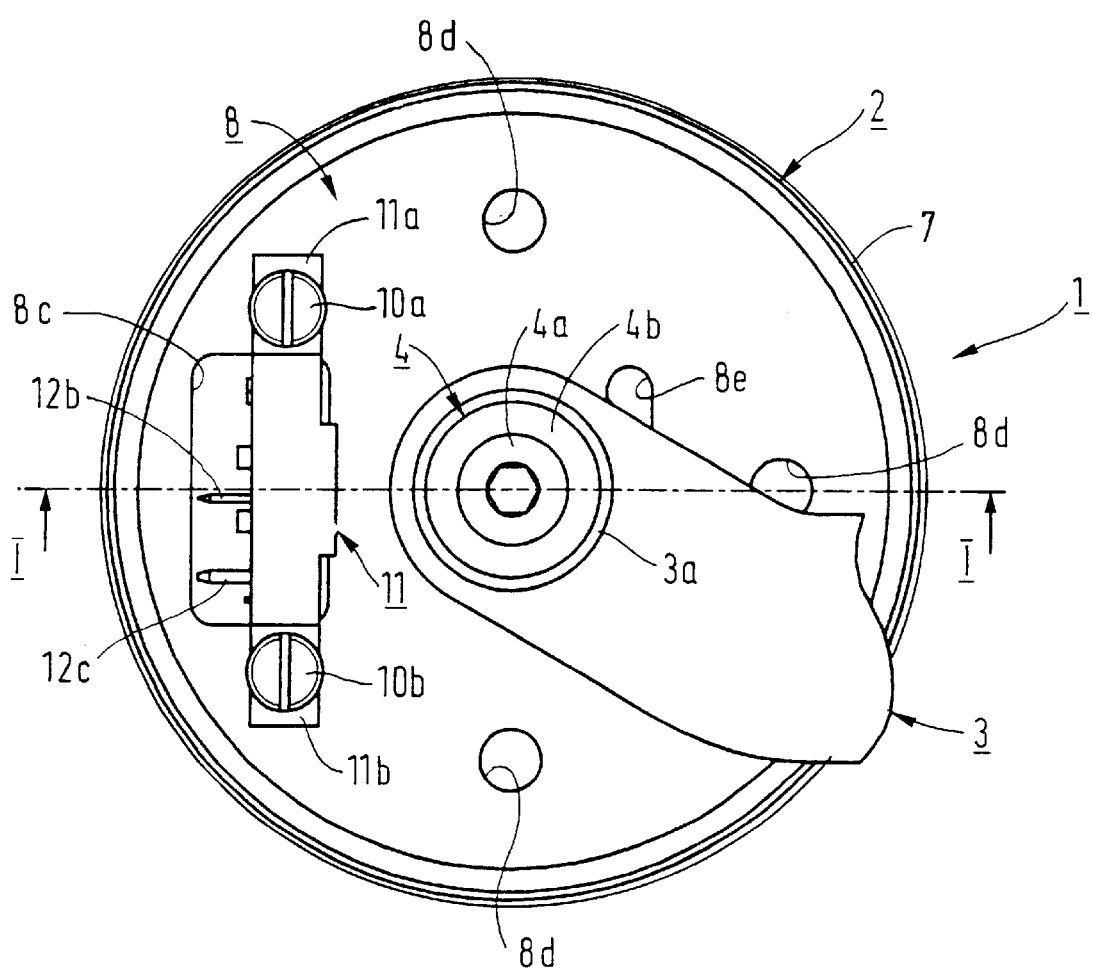
FIG. 2 is a diagrammatic top view of the components from FIG. 1.
Figure 3:
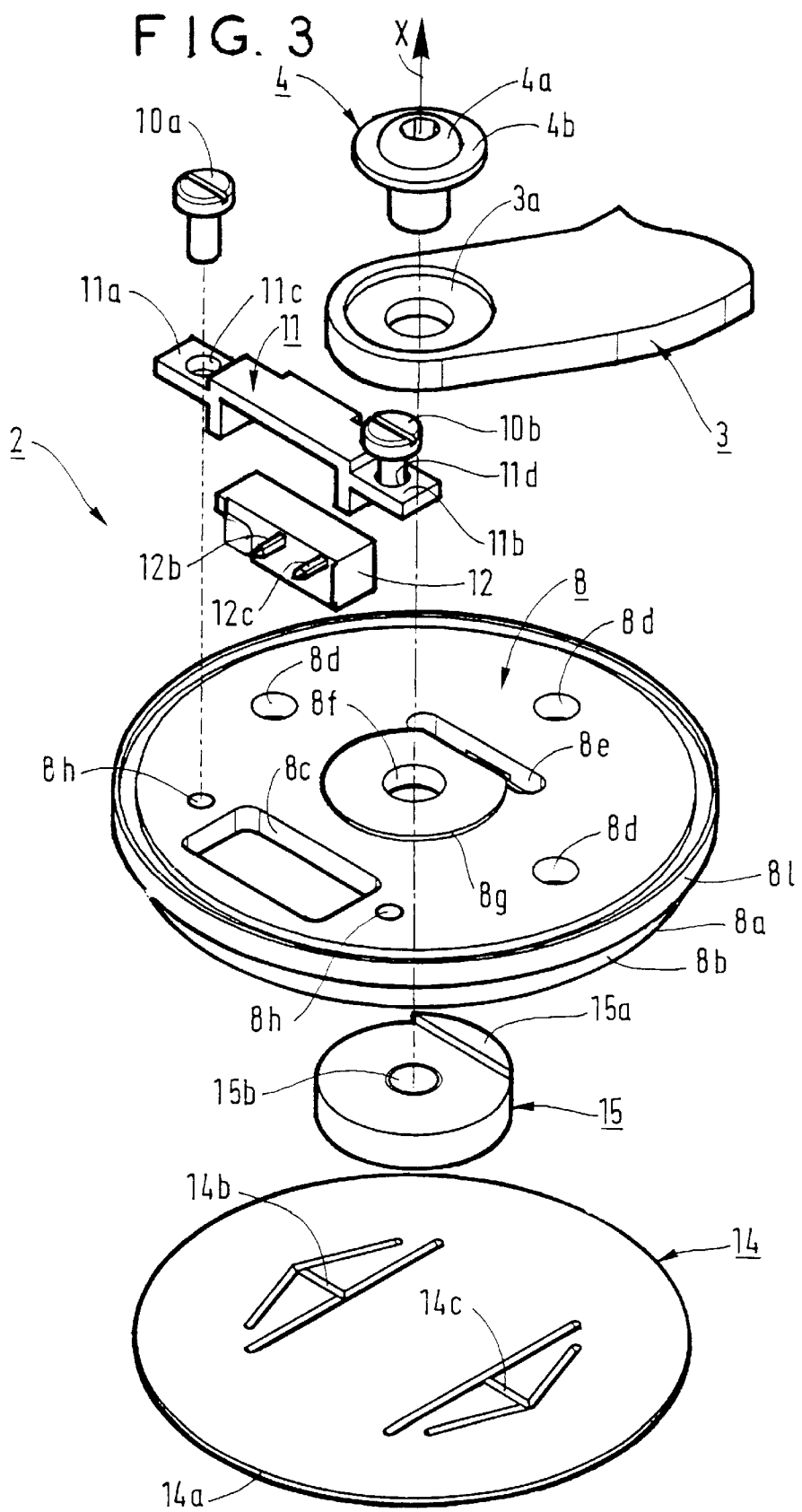
FIG. 3 is a diagrammatic exploded perspective view of the components at the positive end of the cell of FIGS. 1 and 2 and the switch and connecting components external to the cell.

The cell 1 shown in FIGS. 1 to 3 is a sealed lithium-ion type cell. It has a capacity of 30 Ah to 50 Ah and is used to power electric or hybrid vehicles. It comprises a container in the form of a practically cylindrical can 7 closed by a cover 8. At one end 22 the cell 1 has a negative terminal. At its other end 2 the cell 1 has a positive terminal. The cell 1 includes an electrochemical stack 9 including at least one alternation of positive electrode (s) 5, negative electrode(s) 17, and separator (not shown), generally wound in a spiral about an axis X on a central support 19 inserted into the can 7, which is filled with electrolyte. The support 19 is made from an insulative material. In a variant that is not shown, the support 19 is insulated from the electrodes 5 and 17, for example by a material of the same type as the separator, without itself being insulative.

The end of the cell 1 incorporating the negative terminal 22 includes a portion of the can 7. The negative terminal 22, which generally comprises components made of metal, for example copper, is insulated from the can 7 by a top gasket 25 and a bottom gasket 31. Blades 24 connected to the negative electrode 17 are welded to a connecting part 29. The connecting part 29 is in contact with a screw 18 which immobilizes a nut 20, a spring washer 21 and flat washer 23. A screwthreaded housing 30 at the center of the connecting part 29 provides access to an electrolyte filler hole 32 to which is blocked by a screw 26 to which are fitted a gasket 27 and then a nut 28 screwed into the housing 30. All that is then required to make the electrical connection to the outside of the cell 1 is to accommodate the screw 18 in the external part of the housing 30 and to collect the current from the screw 18 by any appropriate means.

The polarity of the positive end 2 is the same as that of the can 7 and that of the electrode 5, which is welded to the can 7 via a plurality of connecting blades 6. The cover 8 has an outside peripheral face 81 welded to the can 7. The current flows from the electrode 5 via the blades 6 to the can 7, and then to the cover 8 and the cap 14, and returns to the part 3 via the tight contact with the cover 8. The end 2 of the cell 1 is sealed by a part 14 which is welded to the part 8 which is in turn welded to the can 7.

The electrode 5 can instead be connected via the blades 6 to the protruding part 8a of the cover 8, more particularly to an outside peripheral face 8b of said protruding part 8a. The outside peripheral face 8b can have a slightly protruding circular part to facilitate this connection.

A metal sealing safety cap 14 with weakened areas 14b and 14c is fixed by welding its outside peripheral face 14a to an inside face 8m of a protruding part 8a of the cover 8 inside the cell 1 and within the perimeter of the cover 8. The parts 8, 7 and 14 are made of aluminum.

The cap 14 is a stamped part, which advantageously simplifies its manufacture and most importantly greatly reduces its cost compared to a machined part.

According to the invention, an electrical connection member 3 external to the cell 1 is fixed to the cover 8 at the end 2, the two parts 8 and 3 being fastened together by clamping means in the form of a nickel-plated steel nut 15 bearing on the inside face of the cover 8 and co-operating with a screw 4 external to the cell 1. The screw 4 has a head 4a and a ring 4b which is inserted into a housing 3a provided for this purpose in the part 3. The cover 8 also includes a screwthreaded opening 8f accommodating part of the screw 4. In a variant the cover 8 does not have a screwthread. The clamping provided by the clamping means consisting of the nut 15 co-operating with the screw 4 is usually sufficient to make the electrical connection between the cover 8 and the part 3.

The nut 15 has a rotation-preventing function and is immobilized in a housing 8e of the cover 8 by a protruding part 15a. The cover 8 has a part 8g projecting slightly on the side opposite the cap 14. The screw 4 immobilizes the nut 15 by interengaging with it via a screwthread 15b.

The nut 15 and the metal sealing cap 14 are not in direct contact: there is a clearance between these two components, which has the advantage that no force is applied to the cap 14 during manufacture or normal use of the cell 1.

The fact that the material of the nut is nickel-plated steel and that the other main parts 14, 8 and 7 of the end 2 are made of aluminum confers several advantages on the cell 1 of the invention. Firstly, the positive end 2 is highly resistant to tightening during assembly of the end 2 to the electrical connecting member 3, which provides more efficient clamping and improved resistance to crushing. Resistance to a pressure rise inside the cell 1 is also improved, and the cell 1 is therefore more resistant to deformation due to an increase in internal pressure. Of the parts 8 and 14, it is the part 8 which, by virtue of its thickness relative to the thickness of the part 14, supports most of the mechanical force applied to the end 2 because of the presence of the nut 15.

The cover 8 includes openings 8c and 8d adapted to allow gas to escape from the cell 1 via the weakened portions 14b and 14c in the event of the internal pressure rising above a calibrated pressure equal to P1 which causes the weakened areas 14b and 14c to open into a housing 16 formed between the parts 8 and 14 due to the presence of the nut 15. The pressure P1 is typically from $10 \times 10^5$ to $15 \times 10^5$ Pa.

An electronic switch 12 with a sensor 12a is accommodated in a portion 13 of the housing 16 via the opening 8c of the cover 8. The pressure sensor 12a, which is in the form of a push-button, faces the cap 14 and senses any deformation of the cap 14 due to the pressure increasing above a calibrated pressure which is practically equal to P2. The pressure P2 is typically from $8 \times 10^5$ to $10 \times 10^5$ Pa. The pressure P2 is preferably slightly less than or practically equal to the pressure P1. For example, the pressure P2 is of the order of $8 \times 10^5$ Pa and the pressure P1 is of the order of $10 \times 10^5$ Pa.

In normal manufacture and operation of the cell 1, the parts 12a and 14 are not in contact and there is clearance between them. The switch 12 is glued to a supporting member 11. The sensor 12a can be replaced by a voltage sensor with the appropriate connections.

In another embodiment, not shown, and optionally independently of the preceding embodiment, the cap 14 has a practically concave part facing the sensor 12a which turns inside out if the pressure rises to a value greater than or equal to P2, assuming a convex shape relative to the sensor 12a and coming cleanly into contact with the sensor 12a.

The switch 12 is connected by electric wires (not shown) to an external system (not shown) which cuts off. the current if the internal pressure rises to a value greater than or equal to P2. The wires are soldered to the terminals 12b and 12c of the switch 12 (see FIGS. 2 and 3, not visible in FIG. 1). When the pressure inside the cell reaches a value greater than or equal to the pressure P2, contact is made between the sensor 12a and the cap 14, as explained above, supplying electrical information to an electronic circuit connected to the terminals 12b and 12c of the switch 12. For example, the contact which is made produces a short-circuit between the terminals 12b and 12c of the switch 12. Thus an electrical device external to the cell 1 can disconnect current feed to the cell 1 in order to stop at least some of the pressure rise inside the cell 1.

The switch 12 can be a commercially available device, in which case it can include other components not directly related to the present invention, or it can be a switch specifically constructed for this use. The switch 12 can include any other maintaining means facing and in the vicinity of the cap 14.

However, in the event of an internal pressure rise in the cell 1, the user is at risk if the pressure rise is not stopped quickly and/or the control electronics for the cell 1 are faulty. This is why, in response to the internal pressure rising to above the pressure P1, the weakened areas 14b and 14c at the positive end 2 open into the housing 16. This opening of the weakened areas 14b and 14c allows gas to escape via the openings 8d and 8c in the cover 8. Because of the nickel-plated steel nut 15 and the inertia of the cover 8, the weakened areas 14b and 14c open in a controlled manner. The cover 8 is therefore subject to practically no movement.

The cover 8 associated with the clamping means 15 co-operating with the screw 4 is used to stiffen the positive end 2 and virtually eliminates any significant component movement before the weakened areas 14b and 14c open as a result of swelling caused by the pressure rise inside the cell 1. Also, it should be noted that the opening of the weakened areas 14b and 14c does not interrupt an electrical circuit between the cell 1 and the external electrical connection part 3 via the cover 8, the supply of electrical power to the cell 1 typically being controlled by control electronics external to the cell 1 and possibly independent of the end 2.

The cell 1 is assembled by winding the alternating electrodes 5, 17 and separator around the support 19 along the axis X, to constitute the stack 9, after which the stack 9 is held in place and the blades 24 are welded to the part 29, after which the bottom gasket 31 and the stack 9 are inserted into the can 7. The top gasket 25 is then fitted. The positive end 2 is then assembled, as shown in FIG. 3, by successively nesting the parts 14, 15, 8 and 3 and then inserting the resulting assembly into the can 7. Leakproof welds are then made between the parts 14 and 8 and between the parts 8 and 7. The blades 6 are welded to the can 7 before inserting the positive end 2 into the can 7. In a variant in which the blades 6 are welded to the cover 8, the welding is carried out by offering up the pre-assembled positive end 2 and then welding the positive end 2 to the can 7 via the cover 8.

It then remains only to introduce the electrolyte via the hole 32, after which the hole 32 is sealed by the screw 26 (which is prevented from rotating) the gasket 27 and the nut 28. The screw 18 is then fitted and immobilizes the plane washer 25, the spring washer 21 and the nut 20 to produce the negative terminal 22. To finish, the connection to the connecting part 3 external to the cell is made by fixing the connecting part 3 to the cover 8 by interengagement of the screw 4 with the screwthreads 15b of the nut 15 and 8f of the cover 8.

The switch 12 is fixed to the cover 8 by two screws 10a and 10b which screw into respective lugs 11a and 11b of the part 11 which have respective screwthreaded housings 11c and 11d for this purpose. The screws 10a and 10b therefore provide the connection between the part 11 and the cover 8, where two screwthreaded openings 8h (see FIG. 3, not visible in FIG. 2) are provided to receive the screws 10a and 10b.

Figure 4:
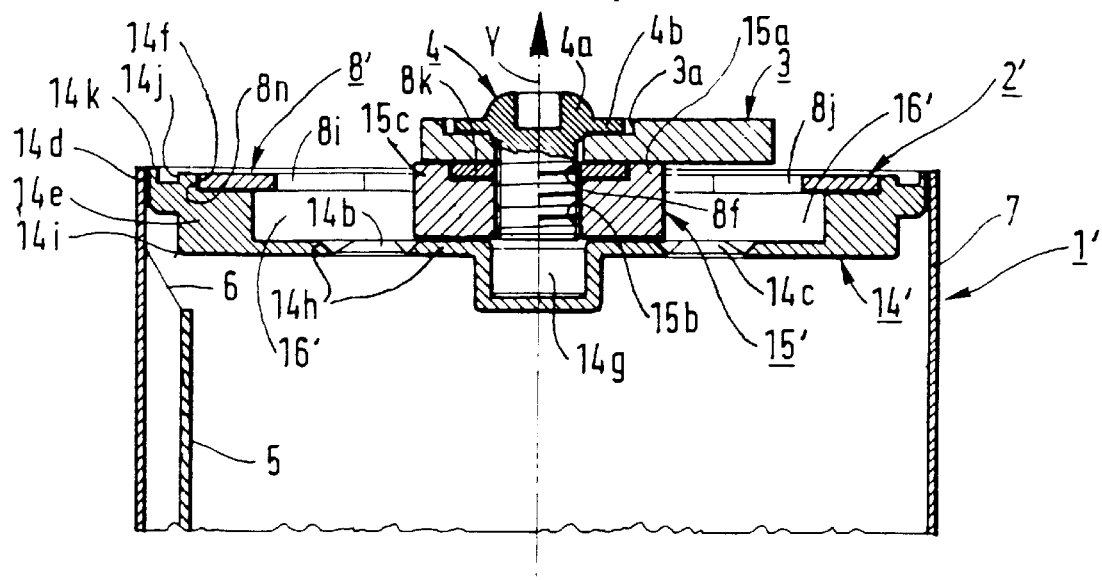
FIG. 4 is a diagrammatic fragmentary view in longitudinal section taken along the line IV—IV in FIG. 5 of the positive end of a different embodiment of a cell of the invention, in which the clamping means comprise a nut.
Figure 5:
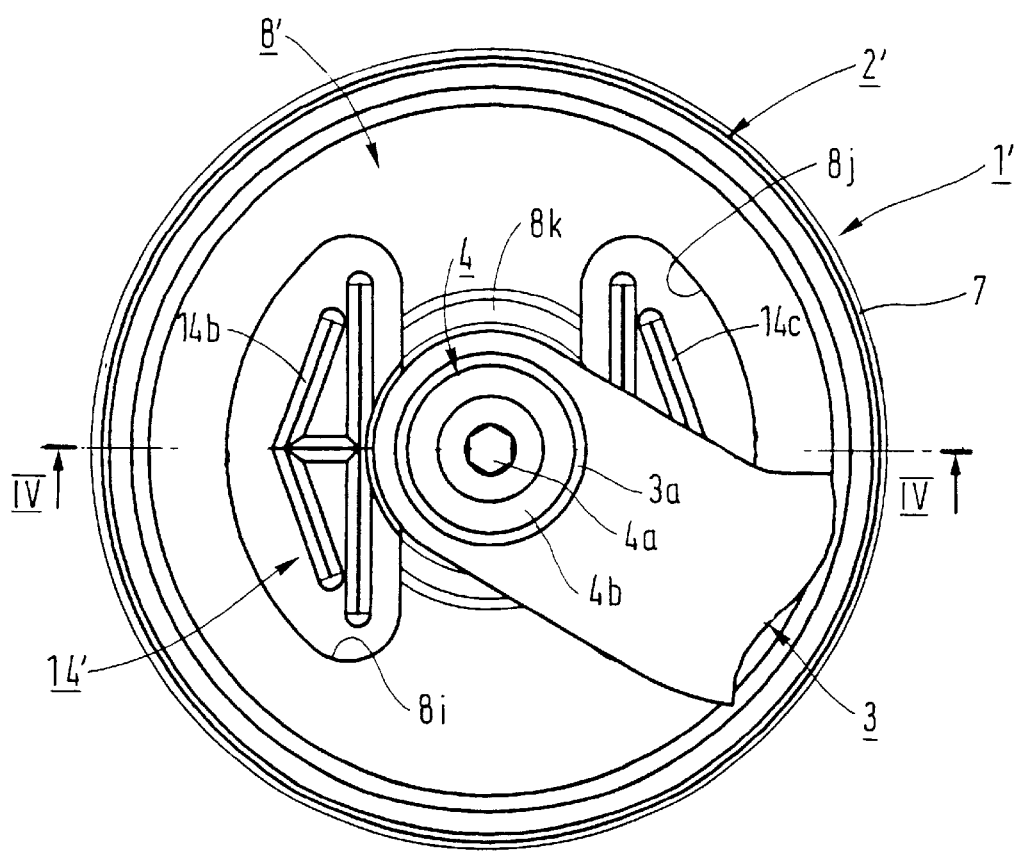
FIG. 5 is a diagrammatic top view of the components from FIG. 4.
Figure 6:
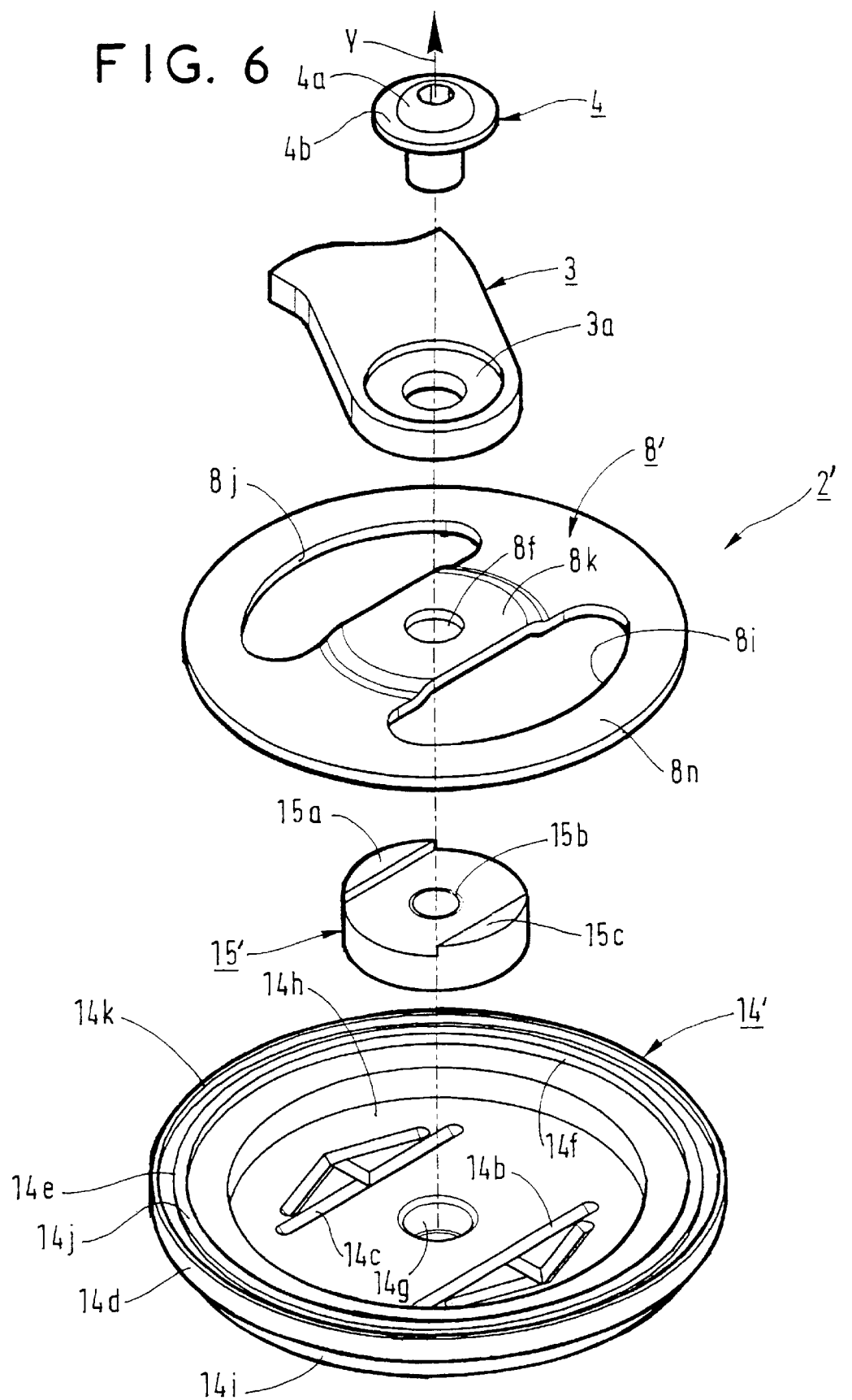
FIG. 6 is a diagrammatic exploded perspective view of the components at the positive end of the cell of FIGS. 4 and 5 and connecting components external to the cell.

The cell 1' shown in FIGS. 4, 5 and 6 is similar to the cell shown in FIGS. 1 to 3, except that the latter's positive end 2 is replaced by a positive end 2' constituting another embodiment of the invention. Only part of the practically cylindrical can 7 with its axis Y and positive electrode 5 are shown here, the electrode being shown in highly schematic form. The negative end 22 is not shown.

The cell 1' has a metal sealing cap 14' and a cover 8'. An electrical connection member 3 external to the cell 1' is mounted on the cover 8' of the positive end 2' and the two parts 8' and 3 are fastened together by clamping means in the form of a nut 15' co-operating with a screw 4 external to the cell 1'. The cap 14' has a central part 14h and a peripheral part 14e. The cell 1' is sealed by welding the cap 14' to the can 7.

The polarity of the positive end 2' is the same as that of the can 7 and that of the electrode 5 welded to the can 7 by means of a plurality of connecting blades 6. The cover 8' has an outside peripheral face 8n welded to an inside peripheral face 14f of a projecting part 14j of the peripheral part 14e of the cap 14'. The cap 14' has weakened safety areas 14b and 14c and is fixed by welding to the can 7 an outside peripheral face 14d of a projecting part 14k on the peripheral part 14e of the cap 14'. The parts 8', 7 and 14' are made of aluminum. The electrode 5 can instead be connected by means of the blades 6 to the central part 14h of the cap 14' inside the cell 1', more particularly to the outside peripheral face 14i of the central part 14h.

Between the cap 14' and the cover 8' is a nickelplated steel nut 15' which represents the clamping means in accordance with the invention co-operating with the assembly means in the form of the screw 4. The nut 15' has a rotation-preventing function, being immobilized in the housings 8j and 8i of the cover 8' by respective protruding parts 15a and 15c. The cover 8' has a part 8k projecting slightly on the side opposite the cap 14'. The screw 4 immobilizes the nut 15' by interengagement with it via a screwthread 15b. The nut 15 and the cap 14' are not in direct contact: there is a clearance between the two parts. The advantages of the material from which the nut 15' is made, which is nickel-plated steel, are the same as previously explained for the nut 15 of the cell 1.

The cover 8' includes two housings 8i and 8j adapted to allow gas to escape from the cell 1' via the weakened areas 14b and 14c, respectively, in the event of an increase in the internal pressure above a calibrated pressure equal to P1, which causes the weakened areas 14b and 14c to open. The pressure P1 is of the same order of magnitude as that specified for the cell 1 shown in FIGS. 1 to 3. The cover 8' also includes a screwthreaded opening 8f which accommodates a portion of the screw 4.

The cap 14' also includes a housing 14g adapted to facilitate tightening of the screw 4 and which most importantly has the advantage of not applying force to the cap 14' during manufacture of the cell 1'.

The operation of the positive end 2' shown in FIGS. 4, 5 and 6 is practically identical to the operation of the positive end 2 shown in FIGS. 1, 2 and 3. If the internal pressure rises up to or above the pressure P1, the weakened areas 14b and 14c of the positive end 2' open into a housing 16' created between the parts 14' and 8' by the nut 15'. This enables gas to escape through the housings 8i and 8j of the cover 8', which provides better protection for the user. Because of the nickel-plated steel nut 15 and the inertia of the cover 8', the weakened areas 14b and 14c open in a controlled manner. The cover 8' is therefore subject to practically no movement. The cover 8' stiffens the positive terminal 2' and prevents any significant movement of parts before the weakened areas open due to the inflation caused by the pressure rise inside the cell 1'. Unlike the cell 1, in the cell 1' it is the part 14' which, because of its thickness relative to the thickness of the part 8', supports most of the mechanical force applied to the end 2' by virtue of the presence of the nut 15. Compared to the cell 1 shown in FIGS. 1 to 3, assembly of the cell 1' requires one additional weld, which makes assembling the cell 1' more costly and slightly more complicated than assembling the cell 1. On the other hand, the cap 14' is easier to machine than the cap 14.

Figure 7:
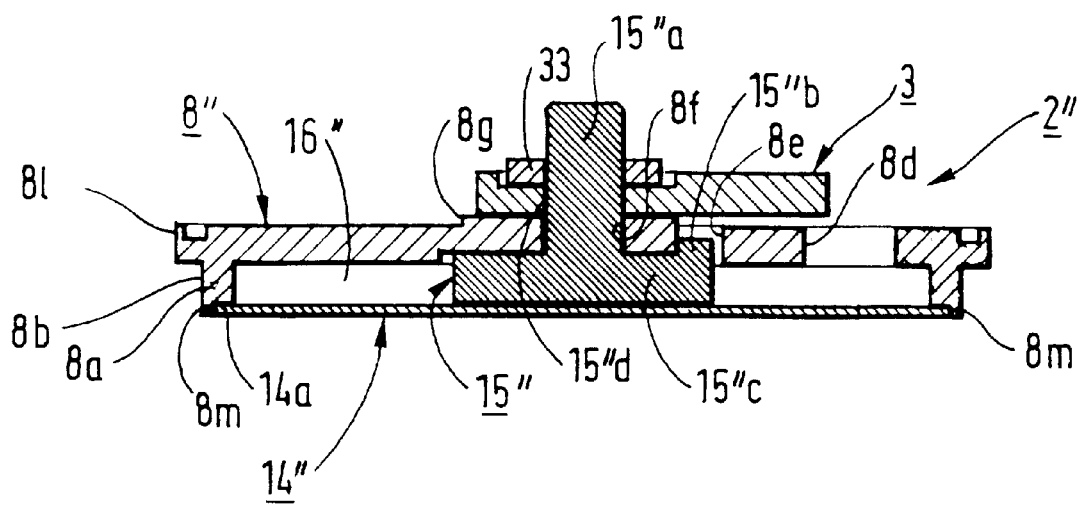
FIG. 7 is a diagrammatic fragmentary view in longitudinal section taken along the line I—I in FIG. 2 of the positive end of a different embodiment.

FIG. 7 is a diagrammatic fragmentary view in longitudinal section taken along line I—I in FIG. 2 of a positive end 2" similar to that shown in FIG. 1, with the following differences:

there is no opening 8c in the cover 8",
the cap 14 is replaced by a metal sealing cap 14" with no safety weakened areas, and the clamping means comprise a pin 15" instead of a nut 15.

The pin 15" has a protruding central part 15"a with a screwthread 15"d. The central part 15"a passes through the cover 8". The pin 15" also has a part 15"c which presses against the inside face of the cover 8" and a rotation-preventing protruding part 15"b. The pin 15" is a machined part.

The cover 8" includes three openings 8d and has an outside peripheral face 8l, a protruding part 8a with an outside peripheral face 8b, a slightly protruding part 8g, a screwthreaded opening 8f for the part 15"a of the pin 15" and an inside face part 8m which is welded to the peripheral part 14a of the part 14". A housing 16" is created between the parts 8" and 14". The cover 8" also includes a housing 8e for keying the protruding rotation-preventing part 15"b. After inserting the part 3 in the part 15"a, the connection to an external connecting part 3 is made by fixing the parts 15" and 3 together by tightening a clamping nut 33 onto the screwthread 15"d.

Figure 8:
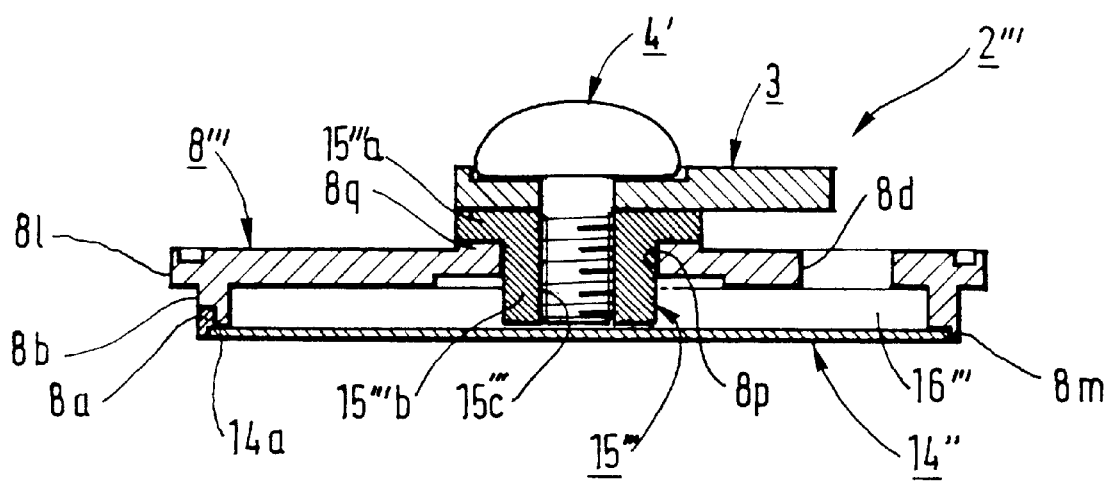
FIG. 8 is a diagrammatic fragmentary view in longitudinal section of a positive end of a different embodiment of the invention.

FIG. 8 is a diagrammatic fragmentary view in longitudinal section of a positive terminal end 2''' as shown in FIG. 7, except that:

the clamping means comprise a bush 15''' instead of a pin 15", and the central opening of the cover 8''' matches the bush 15'''.

The bush 15''' is a cylindrical part which is a force-fit in the cover 8'''. It has a screwthreaded inside cylindrical housing 15'''c and a top part 15'''a on which the connecting part 3 bears. The bush 15''' is a machined part which can be machined specially or purchased off the shelf.

The cover 8''' includes three openings 8d and has an outside peripheral face 8l, a protruding part 8a with an outside peripheral face 8b, a slightly protruding part 8q, an opening 8p in which the main part 15'''b of the bush 15''' is a force-fit, and an inside face part 8m which is welded to the peripheral part 14a of the part 14". A housing 16''' is created between the parts 8''' and 14". The force-fit of the part 15"b in the opening 8p prevents the bush 15''' rotating. The connection to the external connecting part 3 is effected by interengagement of the screw 4' with the screwthreadeded cylindrical housing 15"c.

Of course, the cell of the invention is not limited to the embodiments described above.

The cell of the invention can be used in a cell module, typically a cell module with six cells, three connected in series with the two sets of three connected in parallel, or two connected in series with the three sets of two connected in parallel, or as a battery comprising at least one above-described module, and typically a battery of thirty modules connected in series.

What is claimed is:

1. A sealed storage cell, of capacity greater than 10 Ah, including a substantially cylindrical container, an electrochemical stack, and two opposite ends providing terminals of opposite polarities, one of the ends comprising aluminum, wherein:

said one end comprises an aluminum cover, said aluminum cover is adapted to be brought into electrical contact with an electrical connecting part external to the cell by a clamping structure which is at least in part on the side of said cover inside the cell and which co-operates with an assembly mechanism external to the cell, and said clamping structure is made from a material selected from the group consisting of stainless steel, nickel-plated steel, copper, and brass; and said cover of said cell is sealed by a metal sealing cap on the side of the cover inside the cell.

2. A cell according to claim 1, wherein the container is made of aluminum.

3. A cell according to claim 1, wherein the clamping structure comprises a screwthread.

4. A cell according to claim 3, wherein the clamping structure includes a part which bears on the face of said cover inside the cell and has a screwthread.

5. A cell according to claim 4, wherein the clamping structure comprises a nut co-operating with an assembly mechanism in the form of a screw.

6. A cell according to claim 4, wherein the clamping structure comprises a pin co-operating with an assembly mechanism in the form of a nut.

7. A cell according to claim 3, wherein the clamping structure comprises a bush co-operating with an assembly mechanism in the form of a screw.

8. A cell according to claim 1, wherein the clamping structure is associated with a rotation-preventing system.

9. A cell according to claim 1, wherein the cover includes openings enabling gas to escape from the cell.

10. A cell according to claim 9, wherein said metal sealing cap includes at least one weakened area adapted to rupture if the pressure inside the cell increases to an internal pressure value greater than or equal to a first pressure to enable gas to escape from the cell.

11. A cell according to claim 10, wherein the clamping structure is adapted to prevent deformation of a part of said metal sealing cap in the event of a pressure rise inside the cell up to a value of the internal pressure greater than or equal to the first pressure.

12. A cell according to claim 11, wherein said part of said metal sealing cap is its central part.

13. A cell according to claim 1, having a switch including a sensor installed in a housing via an opening in the cover so that the sensor faces the metal sealing cap, the switch further having two termninals for making an electrical connection to an electronic disconnector device adapted to interrupt the flow of current in the cell in the event of deformation of said metal sealing cap due to the pressure inside the cell rising to a value greater than or equal to a second pressure, the second pressure being less than or equal to the first pressure.

14. A cell according to claim 13, wherein a portion of said metal sealing cap is adapted to be turned inside out by the pressure inside the cell rising to a value greater than or equal to the second pressure, so as to be in electrical contact with the switch.

* * * * *